US011981024B2

(12) United States Patent
Raak et al.

(10) Patent No.: US 11,981,024 B2
(45) Date of Patent: May 14, 2024

(54) MANIPULATOR HAVING JOINTS AND MULTI-FUNCTIONAL PROFILE FOR SAME

(71) Applicant: igus GmbH, Cologne (DE)

(72) Inventors: Martin Raak, Cologne (DE); Felix Berger, Cologne (DE)

(73) Assignee: IGUS GMBH, Cologne (DE)

( * ) Notice: Subject to any disclaimer, the term of this patent is extended or adjusted under 35 U.S.C. 154(b) by 674 days.

(21) Appl. No.: 16/980,553

(22) PCT Filed: Feb. 27, 2019

(86) PCT No.: PCT/EP2019/054794
§ 371 (c)(1),
(2) Date: Dec. 30, 2020

(87) PCT Pub. No.: WO2019/174912
PCT Pub. Date: Sep. 19, 2019

(65) Prior Publication Data
US 2021/0114234 A1 Apr. 22, 2021

(30) Foreign Application Priority Data
Mar. 15, 2018 (DE) ...................... 20 2018 101 463.3

(51) Int. Cl.
*B25J 17/00* (2006.01)
*B25J 9/00* (2006.01)
(Continued)

(52) U.S. Cl.
CPC ............. *B25J 17/00* (2013.01); *B25J 9/0009* (2013.01); *B25J 9/08* (2013.01); *B25J 9/102* (2013.01); *B25J 9/126* (2013.01)

(58) Field of Classification Search
CPC ..... B25J 9/08; B25J 9/102; B25J 9/103; B25J 17/025; F16H 57/12; F16H 55/18; F16H 2057/126; F16H 2057/127
See application file for complete search history.

(56) References Cited

U.S. PATENT DOCUMENTS 5,201,239 A 4/1993 Bundo et al.
6,931,745 B2 8/2005 Granger
(Continued)

FOREIGN PATENT DOCUMENTS

CN 1611913 5/2005
CN 202763836 3/2013
(Continued)

OTHER PUBLICATIONS

Office Action from related Japanese Appln. No. 2020-549006, dated Apr. 5, 2022. English translation attached.
(Continued)

*Primary Examiner* — T. Scott Fix
(74) *Attorney, Agent, or Firm* — Grossman, Tucker, Perreault & Pfleger, PLLC

(57) ABSTRACT

A manipulator comprising at least one profile as a supporting connection element between two joints and/or between a motor and joint. In order to provide a manipulator that is simply constructed and offers a multitude of design possibilities, according to the invention, the profile is designed as a multi-functional profile with an internal channel and at least one lateral receiving groove, and at least one further multi-functional profile is provided which is designed as a shaft and with at least sections thereof being structurally identical to the multi-functional profile at least in terms of the profile formation, or designed as a rack and with at least sections thereof being structurally identical to the multi-functional profile at least in terms of the cross-sectional contour.

12 Claims, 8 Drawing Sheets

(51) Int. Cl.
  *B25J 9/08* (2006.01)
  *B25J 9/10* (2006.01)
  *B25J 9/12* (2006.01)

(56) References Cited

U.S. PATENT DOCUMENTS

| | | |
|---|---|---|
| 9,395,032 B2 | 7/2016 | Kotula et al. |
| 2002/0006327 A1 | 1/2002 | Stuyt |
| 2016/0034925 A1 | 2/2016 | Unser et al. |
| 2017/0100844 A1 | 4/2017 | Raak et al. |
| 2019/0047142 A1 | 2/2019 | Noda et al. |
| 2019/0084149 A1 | 3/2019 | Raak et al. |

FOREIGN PATENT DOCUMENTS

| | | |
|---|---|---|
| CN | 103501971 | 1/2014 |
| DE | 2301423 | 1/1973 |
| DE | 3629367 | 3/1988 |
| DE | 102010013617 | 10/2011 |
| DE | 202014101342 | 5/2014 |
| DE | 202016101255 | 5/2016 |
| EP | 1617087 | 1/2006 |
| GB | 1455782 | 11/1976 |
| JP | H04152090 | 5/1992 |
| JP | 2002019395 | 1/2002 |
| JP | 2002066965 | 3/2002 |
| WO | 2017138634 | 8/2017 |
| WO | 2018/0405541 | 3/2018 |

OTHER PUBLICATIONS

Office Action from related Chinese Appln. No. 201980025988.8, dated Mar. 10, 2023. English translation attached.

English translation of the International Search Report from corresponding PCT Appln. No. PCT/EP2019/054794, dated Jun. 24, 2019.

English translation of the International Preliminary Report on Patentability from corresponding PCT Appln. No. PCT/ EP2019/ 054794, dated Sep. 15, 2020.

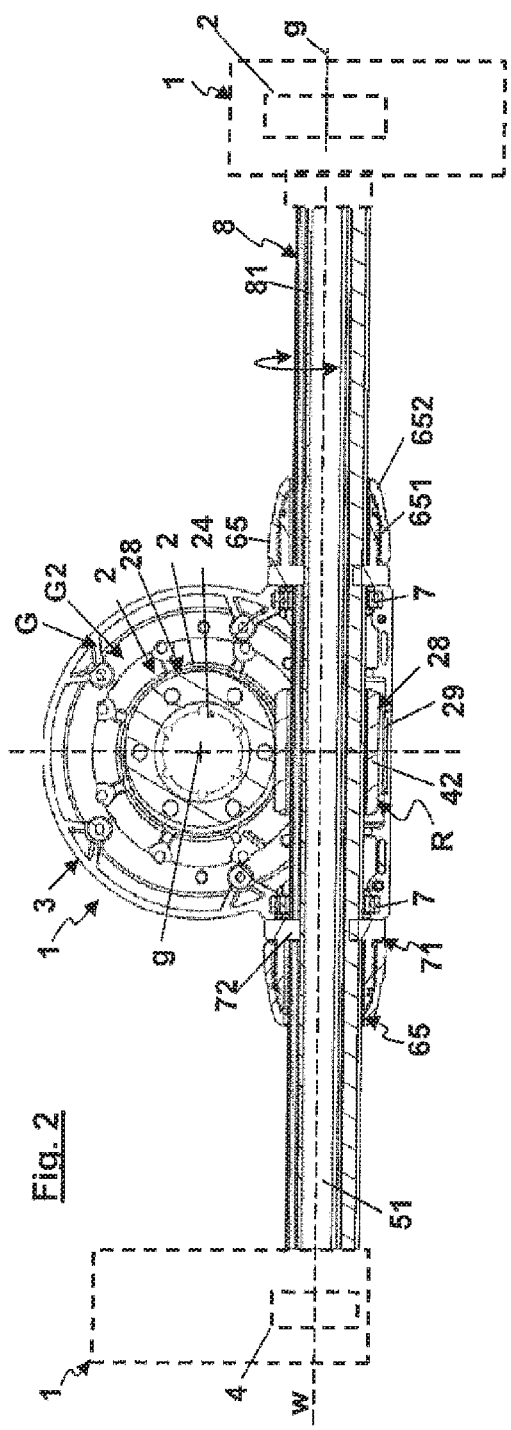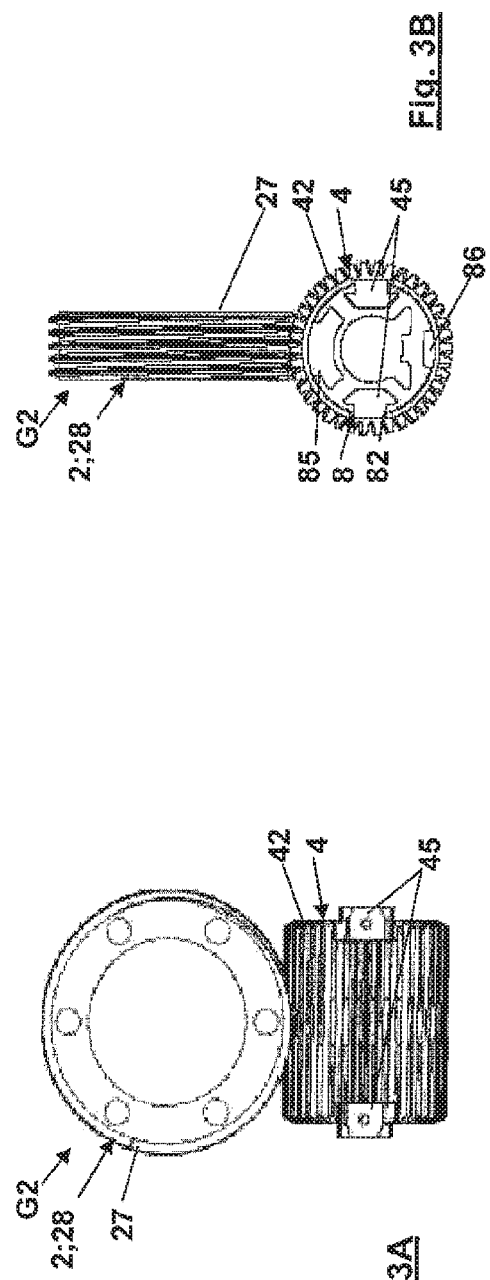

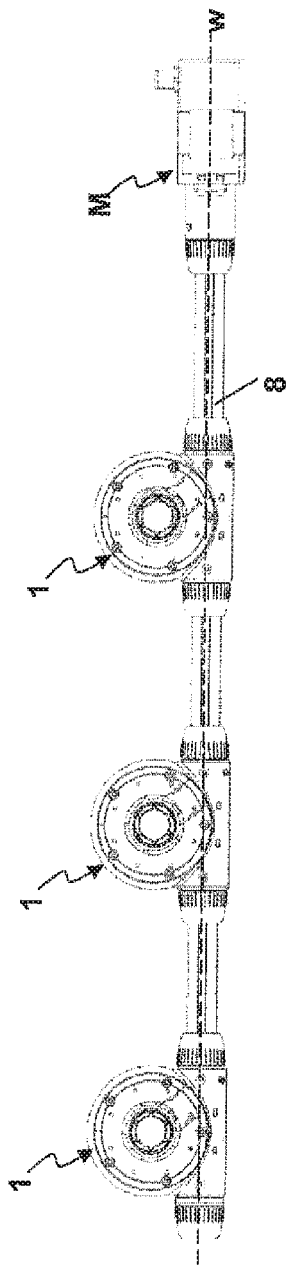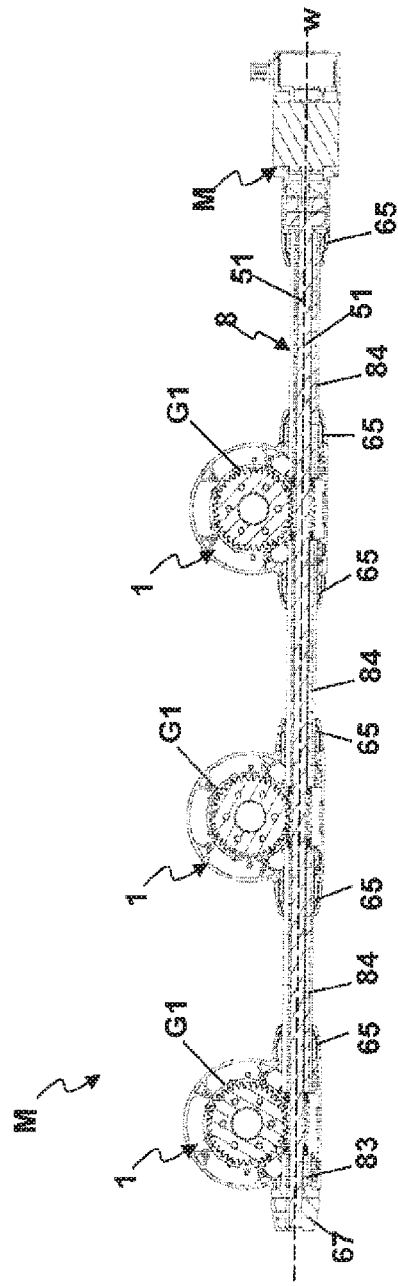
Fig. 10A
Fig. 10B

MANIPULATOR HAVING JOINTS AND MULTI-FUNCTIONAL PROFILE FOR SAME

FIELD

The invention concerns a manipulator comprising at least one profile member as a supporting connecting element between two joints of the manipulator and/or between a joint and a motor associated therewith.

BACKGROUND

A manipulator of the general kind set forth is known from DE 20 2014 101 342 U1, wherein the connecting element is in the form of a hollow profile portion which however scarcely permits possible variations in regard to differing configurations of the manipulator.

SUMMARY

An object of the invention is to provide a manipulator of the general kind set forth, which is of a simple structure and which affords a multitude of design options.

The specified object is already attained in that the profile member is in the form of a multi-function profile member having an internal passage and at least one lateral receiving groove, that there is provided at least one further multi-function profile member which is in the form of a shaft and that the two multi-function profile members are at least portion-wise of identical structure at least in respect of their profile configuration.

By virtue of the use of the multi-function profile member it is possible on the one hand, as described in greater detail hereinafter, to easily develop different configurations of the manipulator which can be inexpensively adapted to given respective tasks. On the other hand, simplifying construction and assembly, the two claimed multi-function profile members are of identical structure at least in respect of their profile configuration. That structural identity in respect of the profile configuration is not related to the absolute sizes of the two multi-function profile members but solely to the cross-sectional shape or cross-sectional contour. Structural identity means that the two multi-function profile members are at least similar and preferably identical in respect of their cross-sections. They can however also be congruent, that is to say equivalent. In addition, the multi-function profile member is also provided between motor and joint whereby thermal influence on the joint is at least minimised. Furthermore, the motor can form a counterweight to the joint. Furthermore, the motor can be of any kind and can only satisfy the requirement that it is suitable for the respective use. Advantageous inter alia because of the low number of lines required the motor used can be a brushless dc motor.

In an alternative way of attaining the object it is proposed that the profile member is in the form of a multi-function profile member having an internal passage and lateral receiving grooves, that there is provided at least one further multi-function profile member which is in the form of a toothed rack and that the two multi-function profile members are of identical structure at least in respect of their cross-sectional configuration. The variability already referred to above is expanded with the tooth profile.

In a further configuration of the manipulator the further multi-function profile member can also be in the form of a supporting connecting element between two joints of the manipulator, between a joint and a working head or between a joint and a motor. It can thus also contribute to the stability and operational stiffness of the manipulator. The multi-function profile member can generally be in the form of a supporting connecting element between two joints of the manipulator, between a joint and a working head or between a joint and a motor.

In an advantageously simple fashion, the multi-function profile members can each have an outside contour which is circular at least in its basic shape. That outside profile of the multi-function profile member, that is circular at least in its basic shape, makes it possible to rotatably mount the multi-function profile member in a simple fashion in order for example to use it for torque transmission. In addition, if required, a gear element like a spur gear can be mounted by way of the at least one outside profile which is circular in its basic shape, in a simple fashion like by means of a clamping fit, for example as a further transmission element. The multiple use options of the multi-function profile member will also be apparent from the fact that, besides its use as a supporting and stiffening connecting element, it can also be in the form of a toothed rack.

Advantageously the lateral receiving grooves can be opened outwardly transversely to the longitudinal direction of the respective multi-function profile member. In that way they are accessible from the exterior, which facilitates in particular assembly and dismantling.

In a further configuration of the manipulator the lateral receiving grooves are arranged peripherally in equally spaced relationship. That spacing can be peripherally at least substantially identical. Peripherally adjacent outside grooves can be arranged on the multi-function profile member, starting from the peripheral centre thereof as a reference point, peripherally at least substantially at equal spacings. The outer grooves can be of a different configuration according to their intended purpose of use.

By way of example a receiving groove forming the first receiving groove can be provided for fixing the multi-function profile member to the housing and/or for fixing additional components, a receiving groove in the form of a second receiving groove can be provided for positioning the further transmission element relative to the housing and/or relative to the gear wheel and/or a receiving groove forming the third receiving groove can be provided for a measuring element.

For example, for fixing the multi-function profile member to the housing or for fixing further devices to the multi-function profile member the second receiving groove and/or the third receiving groove can be of an undercut configuration. In particular there can be provided two first receiving grooves whose cross-sectional profiles are preferably mutually congruent. In particular the first receiving groove can be arranged diametrally with respect to the second receiving groove with respect to a longitudinal direction of the multi-function profile member.

The receiving grooves can be peripherally equally spaced from each other. If there are two first receiving grooves, that is to say a total of four receiving grooves, then the receiving grooves can be arranged in crossed relationship with each other with respect to the longitudinal axis. In particular, in each case with respect to the longitudinal axis, the third receiving groove can be arranged diametrally with respect to the fourth receiving groove.

In an advantageous development of the manipulator the internal passage of the multi-function profile member can be of a substantially circular cross-section. That permits engagement therethrough, in favourable force-mechanical relationship, of a shaft of round cross-section, with the shaft being protected in the passage. In additional the diameter of the shaft can be less than the diameter of the internal passage so that the shaft, arranged at a given spacing, preferably of the order of magnitude of a slip, can rotate freely in the passage.

The internal passage can further have at least one lateral longitudinal chamber for receiving lubricant, for passing a line therethrough and/or for saving on material.

In a further specification of the manipulator a respective multi-function profile member can be operationally connected to a joint at the driven side and the drive side of the joint. This means that those two multi-function profile members can perform different functions in respect of a joint.

In a development of the manipulator the joints can each have a motor drive with a motor and a transmission. The transmission can have a gear wheel rotatable about a transmission axis of rotation and a further transmission element. The gear wheel can be operatively connected to a further transmission element by for example the further transmission element engaging the periphery of the gear wheel. For the further transmission element the transmission can have a operative axis which is spaced with respect to the transmission axis of rotation and by way of which the further transmission element is arranged mounted in or to the housing.

A multi-function profile member can be arranged in the transmission axis of rotation. In addition, a multi-function profile member can be arranged in the operative axis of the respectively associated joint. In particular the multi-function profile member can engage the gear wheel at its end. Alternatively or additionally, a multi-function profile member can be arranged relative to the operative axis tangentially or at the end in relation to the further transmission member.

In particular the transmission can be in the form of a worm transmission. For that purpose, the further transmission element can be in the form of a worm and the operative axis can be in the form of a drive shaft for the worm. The drive shaft can form an axial prolongation of the motor shaft, that is coupled to the drive end. The worm can be arranged non-rotatably on the operative axis. In addition, the operative axis can be rotatably mounted axially preferably at both sides of the worm at or in the receiving portion. The drive shaft can be arranged to be guided in a multi-function profile member. In the case of the worm drive the hollow profile member can be arranged non-rotatably and non-displaceably relative to the housing at and/or in same. For that purpose, suitable projections from the housing can engage into the first receiving groove or the first receiving grooves, in which case the profile thereof is advantageously adapted to the undercut configuration of the respectively associated receiving groove. To produce improved axial non-displaceability of the worm on the drive shaft the multi-function profile member can be divided in the region of the worm into two portions, wherein the portions are respectively arranged with an end towards the worm, in particular by way of a mounting means provided for the drive shaft, at the ends, guided in relation to the worm. The two portions can be arranged spaced from each other over the axial extent of the worm and the drive shaft prolongation.

In a development of the manipulator the transmission can be in the form of an inverted worm transmission with a gear wheel at the drive side and a further transmission element at the driven side. In particular it can be provided that the multi-function profile member forms the operative axis. The worm gear can be arranged non-rotatably on the hollow profile member. The hollow profile member in turn can be mounted rotatably at or in the receiving portion. That affords the possibility that, in addition to the multi-function profile member in the form of the drive shaft, it is possible to provide a further drive shaft which extends in the passage as the drive shaft for the further transmission element. Without transmitting a torque to the hollow profile member, the drive shaft can be guided through the hollow profile member past or through the joint in order for example to couple a torque into an adjacent joint. The gear wheel can have a peripheral male thread and the further transmission component can have a spur tooth arrangement adapted to the male thread. The multi-function profile member can be arranged as a prolongation of the motor axis. It can be non-rotatably connected at its end by way of a coupling to the motor shaft.

In a further advantageous embodiment of the manipulator the transmission can be in the form of a linear transmission. In particular the gear wheel can be in the form of a sprocket and the further transmission element can be in the form of a linear element, in particular a toothed rack element. The toothed rack element can at the same time form the operative axis and can be arranged linearly displaceably on the receiving portion. In an advantageous development the linear element, in particular the toothed rack element, can be fixed in the first receiving groove of the hollow profile member, that in the installation position is open towards the gear wheel. Preferably the linear element is arranged invariably in position in the receiving groove. Preferably the second receiving groove is arranged at an outside of the hollow profile member, that is in diametrally opposite relationship to the operative axis.

With a further increase in the number of possible variations it can be provided that the joint overall and/or the transmission components are respectively of a modular structure. In addition, the manipulator can be of a modular structure. Accordingly, the manipulator, in particular in its components like joint, transmission, multi-function profile member and motor, by virtue of the modular structure, can be easily assembled in accordance with a modular structural principle with a wide range of variations.

The subject-matter of the claimed invention is also a multi-function profile member suitable for a manipulator, as such, which in the simplest configuration has at least one internal passage, an outside contour which is circular in its basic shape, and lateral receiving grooves which are opened outwardly transversely to the longitudinal direction of the multi-function profile member.

In advantageous embodiments the multi-function profile member has one or more of the features set forth as preferred features hereinbefore (in any combination).

BRIEF DESCRIPTION OF THE DRAWINGS

Further details and advantages of the invention will be apparent hereinafter without restriction on the scope of protection from the description of a preferred embodiment with reference to the accompanying drawings in which:

FIG. 2 shows a longitudinal sectional view of a further embodiment of the manipulator with another joint;

FIGS. 3A-3B each show a side view of cooperating transmission portions for the joint of FIG. 2;

FIGS. 10A-10B each show a view of a further embodiment of the manipulator with three joints coupled together;

DETAILED DESCRIPTION

Figure 1A:
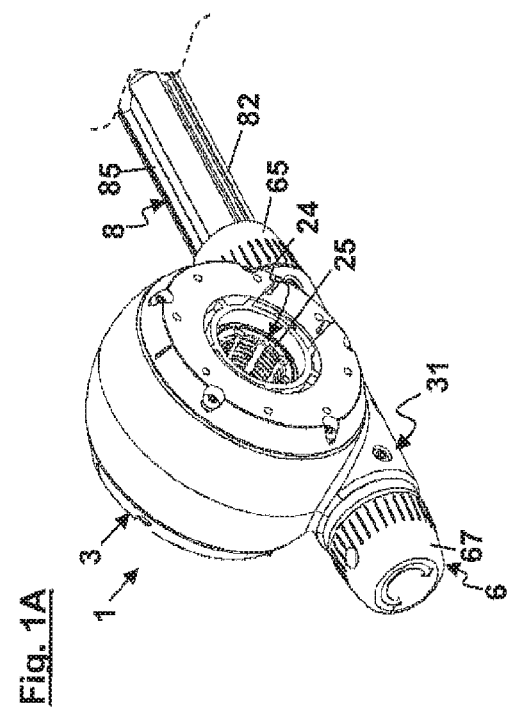
FIGS. 1A-1C each show a view of an embodiment of a joint as part of a manipulator with joints.

FIGS. 1 to 12 show various views, sectional views and individual views of respective embodiments of a manipulator M with joints 1. As can be seen in particular from FIGS. 1C and 9 the joints 1 each have a gear wheel 2 rotatable about a transmission axis of rotation g. As can be seen in particular from FIG. 9 the gear wheel 2 is rotatably mounted at both sides by way of adaptors 22 in bearings 7 in a housing 3 of the joint 1. The two adaptors 22 each have at their side 23 remote from the end face 21 of the gear wheel 2, an opening 24 which is central with respect to the transmission axis of rotation 9 and has a female thread 25. The housing 3 has a receiving portion 31 for receiving a further transmission element 4.

The further transmission element 4 is arranged transversely, here perpendicularly, to the transmission axis of rotation g on an operative axis w. The operative axis w is positioned spaced in the spacing direction a relative to the transmission axis of rotation g. The transmission axis of rotation g, the spacing direction a and the operative axis w are arranged perpendicularly to each other. The transmission element 4 is operatively connected to the periphery of the gear wheel 2. The gear wheel 2 and the further transmission element 4 form a transmission G for transmission of a motor torque which is coupled into the joint 1. The motor 5 is arranged spaced relative to the respectively associated joint 1.

Figure 1B:
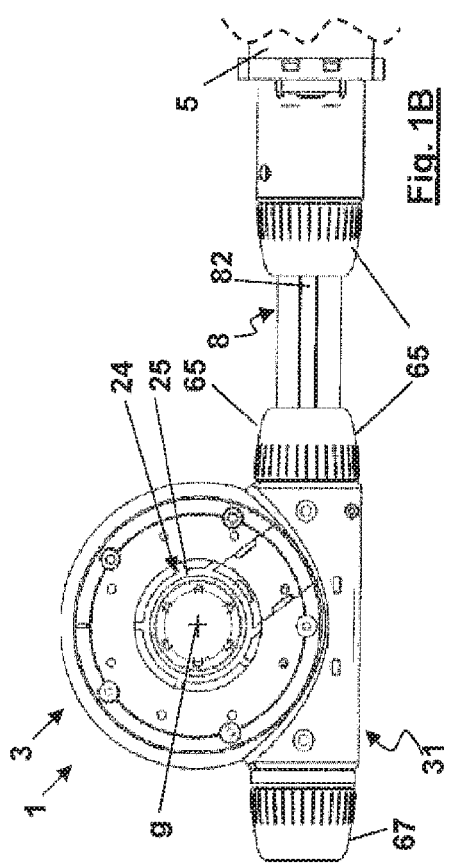
Figure 1C:
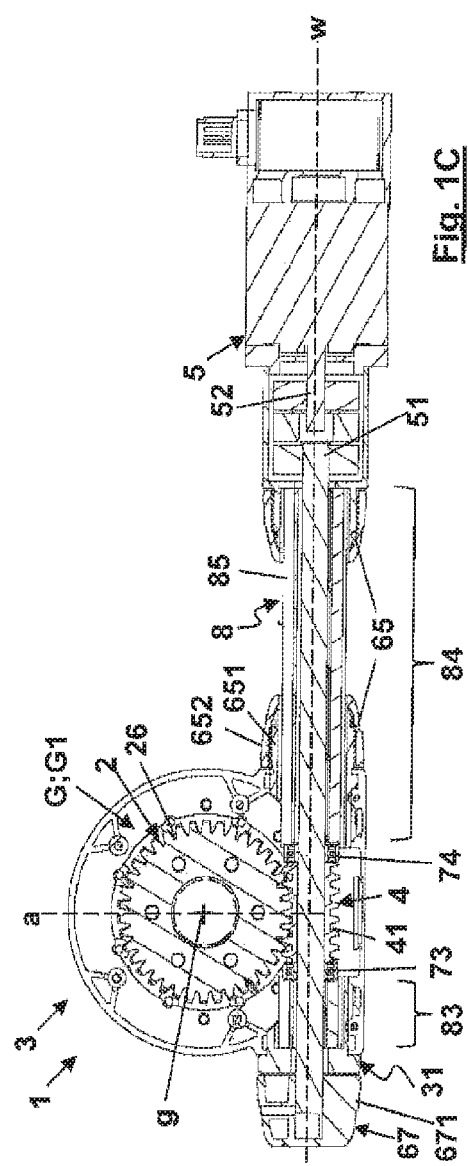

Referring to FIGS. 1 and 10 the transmission G of the joint 1 is configured as a worm transmission G1 with a gear wheel 2 at the driven side, in the form of a worm gear 26, and a further transmission element 4 at the drive side, in the form of a worm 41. Here the operative axis w is a drive shaft 51 driven directly by a motor 5. The worm 41 is arranged in a clamping fit on the drive shaft 51. As can be seen from FIG. 1C the drive shaft 51 is arranged protected and guided in a central internal passage 81 in a multi-function profile member 8. The internal passage 81 is of a substantially circular cross-section in respect of its basic shape. Opening laterally into the internal passage 81, here there are provided two longitudinal chambers 87 which are lateral in relation to the internal passage 81, for example for receiving lubricant, for passing a line therethrough and/or for saving on material. The longitudinal chambers 87 extend over the entire length of the multi-function profile member 8. In relation to their cross-section the longitudinal chambers 87 enlarge the internal passage 81. They are designed and arranged in mirror-image symmetrical relationship in relation to a connecting line between a second receiving groove 85 and a third receiving groove 86.

The multi-function profile member 8 is fixedly connected to the receiving portion. The multi-function profile member 8 is arranged as a supporting connecting element between joint 1 and motor 5. In this embodiment of the joint 1 the hollow profile member 8 serves as protection, guidance and reinforcement, in particular as reinforcement in regard to use stiffness, of the portion of the manipulator M between the motor 5 and the joint 1. The drive shaft 51 is further mounted rotatably axially with respect to the operative axis w on both sides of the worm 41 by way of a respective bearing 7 at the receiving portion 31.

The hollow profile member 8 itself is arranged non-rotatably and non-displaceably relative to the receiving portion 31. For that purpose, provided at both sides 23 of the hollow profile member 8 are first receiving grooves 82 or an undercut configuration, into which engage anchor projections on the receiving portion 31 for non-rotatably mounting the hollow profile member 8.

For engagement of the worm gear 26 into the worm 41 the hollow profile member 8 has two portions, that is to say a first portion 83 and a second portion 84. The two portions 83; 84 are arranged spaced from each other over the extent, axially with respect to the operative axis w, of the drive shaft 51 at the two bearings 7 supporting the hollow profile member 8 and the axial extent of the worm 41. The two portions 83; 84 respectively engage with an end towards the worm 41, at the ends thereof, at the bearing 7 associated therewith, that is to say in each case with respect to the direction from the setting unit towards the worm 41, a front bearing 73 and a rear bearing 74, wherein they are respectively supported at the receiving portion 31 with their other end that is remote from the worm 41.

The second portion 84, arranged at the right in FIG. 1C, is supported by way of a clamping element 65. In the working position it bears peripherally in frictionally locking relationship radially outwardly against the second portion 84. The clamping element 65 is further arranged screwably on the receiving portion 31. The clamping element is so designed that, with progressive screwing at the receiving portion 31, it peripherally exerts a correspondingly increasing axial frictional force on the second portion 84, and in this application that causes frictional engagement with the second portion 84. The multi-function profile member 8 thus serves here as a carrier for the clamping elements 65 and for fixing same.

The first portion 83, arranged at the left in FIG. 1C, bears with its supported end in force-transmitting relationship against a setting unit 67 for adjustment of a play, which is axial with respect to the operative axis, in the operative connection between the worm gear 26 and the worm 41. The setting unit 67 has an adjusting device 671, by way of which, for adjusting play, the first portion 83 of the hollow profile member 8 is pressed against the front bearing 73 axially in the direction from the setting unit 67 towards the worm 41, which in turn can be pressed against the worm 41 as far as freedom from play. In that way the multi-function profile member is at the same time in a further function used as part of the setting unit 67.

FIG. 2 is a cross-sectional view in relation to the transmission axis of rotation g showing a joint 1 as part of the manipulator M. The transmission G is here in the form of an inverted worm transmission G2. Conversely to the worm transmission G1 here the torque is coupled in at the drive side by way of the gear wheel 2 and coupled out at the driven side to the operative axis w by way of the further transmission element 4. As can be seen from FIGS. 3A-3B, corresponding to the reversal, the gear wheel 2 has a peripheral male thread 27 and the further transmission portion 4 has a spur tooth arrangement 42. The multi-function profile member 8, which is thus at the driven side, forms the operative axis w. The spur gear 28 is fixedly arranged on the hollow profile member 8. For that purpose, provided at the spur gear 28 of the further transmission portion 4 are anchor elements 45, by way of which they engage in frictionally locking relationship and/or positively locking relationship into the undercut first receiving grooves 82 of the multi-function profile member 8. Accordingly, here the multi-function profile member 8 serves as a carrier for the second transmission element 4. As the further transmission element 4 is mounted non-rotatably on the multi-function profile member 8 the multi-function profile member 8, in an enlargement of its possible uses, becomes the shaft, insofar as it receives and transmits the torque of the further transmission element 4. The multi-function profile member 8 is here mounted rotatably to the housing 3 by way of two axially mutually spaced clamping elements 65. For rotatable mounting thereof the multi-function profile member 8 has an outside profile which is circular in its basic shape. FIG. 2 diagrammatically indicates the possibility of connecting the multi-function profile member 8 at its end in torque-transmitting relationship for example to two joints 1, more specifically to the further transmission element 4 of the joint 1 at the left in FIG. 2 and/or to the gear wheel 2 of the joint 1 at the right in FIG. 2.

In this embodiment of the joint the above-mentioned internal passage 81 is not required to constitute the inverted worm transmission G2. That affords the option of passing other components like lines or, as indicated by way of example in FIG. 2, a further drive shaft 51, for example for a remote joint 1, through the hollow profile member 8 while being protected thereby, without the further drive shaft 51 transmitting a torque to the joint 1.

Figure 4A:
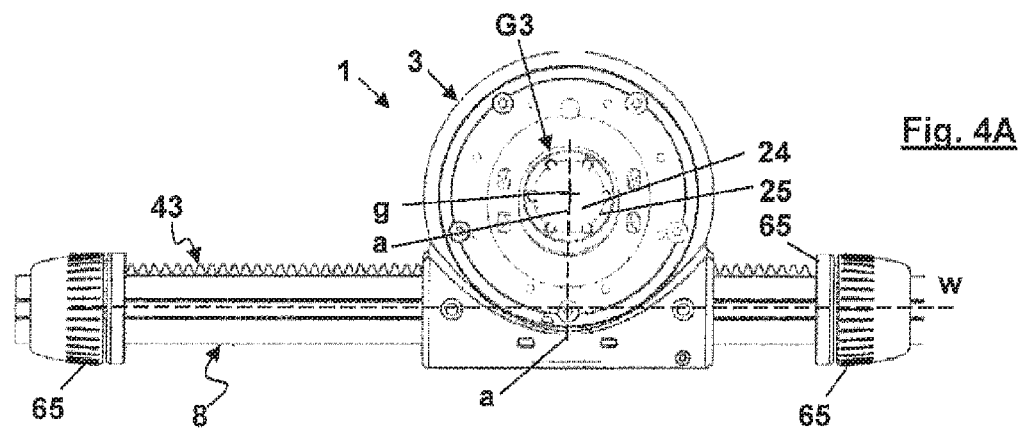
FIGS. 4A-4B each show a longitudinal sectional view of a further embodiment of the manipulator with another joint.
Figure 4B:
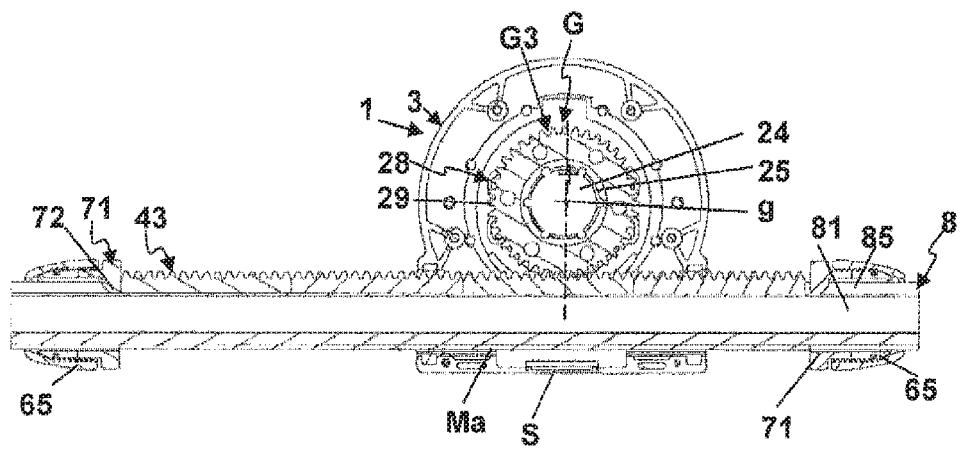

FIGS. 4A-4B respectively show a view of a further embodiment of the joint 1, insofar as here the transmission G is in the form of a linear transmission G3. To provide the linear transmission G3 the gear wheel 2 is in the form of a spur gear 28 and the further transmission element 4 is in the form of a toothed rack element 43. The toothed rack element 43 in the installation position is arranged fixed in a second receiving groove 85 of the multi-function profile member 8. Accordingly, the multi-function profile member 8 in a further possible use becomes the linear component of the linear transmission G3. In addition, the multi-function profile member 8 functions as the operative axis w.

The second receiving groove 85 is open towards the gear wheel 8 in the installation position for threaded engagement of the toothed rack element 43 and the spur gear 28. The toothed rack element 43 is mounted non-rotatably and non-displaceably on the hollow profile member. In the installation position it engages into the first receiving groove 82 by way of a foot 44 adapted to the undercut configuration. In addition, provided on both sides of the toothed rack element 43 are clamping elements 65 which are arranged in a clamping fit on the hollow profile member 8 and against which the toothed rack element 43 bears axially against clamping elements 65. In that way the toothed rack element 43 is held axially non-displaceably in the receiving groove 84.

As can be seen from FIG. 2 clamping elements 65 mounted by way of the multi-function profile member 8 respectively have two coaxial sleeves, that is to say a radially inner sleeve 651 and a radially outer sleeve 652 which are in threaded engagement by way of mutually facing conical screw threads. If, as in the case of the worm transmission G1, the multi-function profile member 8 is to be held fixedly relative to the housing 3, then for assembly purposes with progressive screwing the inner sleeve 651 is pressed by way of the outer sleeve 652 until frictionally locking engagement occurs against the multi-function profile member. If, as in the case of the inverted transmission G2, rotary bearing means are necessary or in the case of the linear transmission G3 linear displaceability of the multi-function profile member 8 is needed, then the two sleeves 651; 652 in themselves can be screwed until encountering an abutment condition, preferably with a self-locking action. As can be seen from FIG. 2 that abutment can be implemented by a peripheral clamping ring 71 having radial projections 72, engaging radially inwardly into the multi-function profile member 8 in non-displaceable and non-rotatable relationship.

Figure 5A:
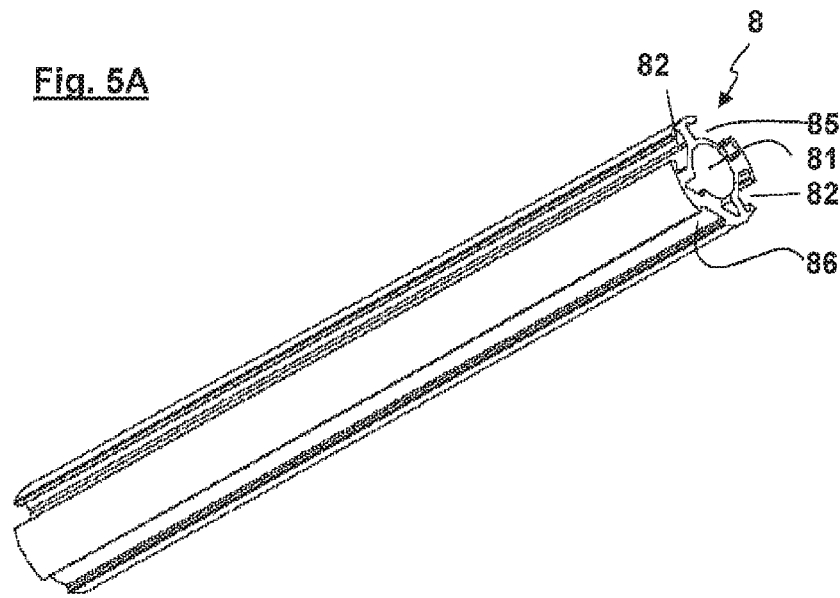
FIGS. 5A-5B each show a view of a multi-function profile member for the manipulator.
Figure 5B:
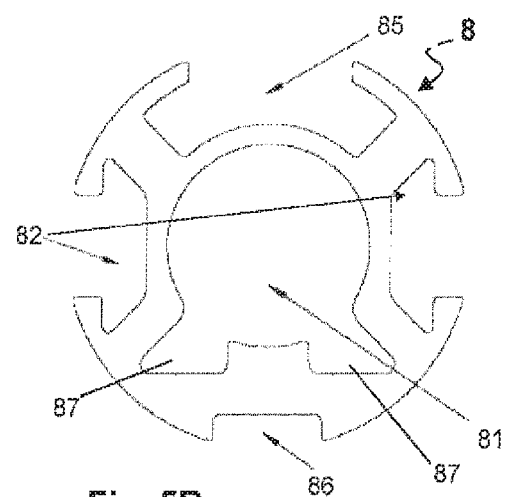

FIGS. 5A and 5B show a perspective view and a cross-sectional view of the multi-function profile member 8. The multi-function profile member 8, like also its above-described portions 83; 84, are respectively made in one piece. They can be cut to length from a preferably extruded profile bar to provide the respectively required length. The term multi-function profile member means just a bar of a given cross-sectional profile configuration.

The term multi-function profile member does not include possible components or devices arranged thereon.

Figure 7:
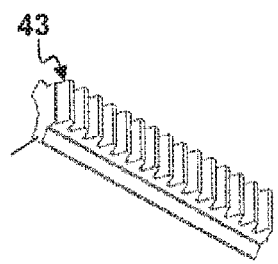
FIG. 7 shows a perspective view of a toothed profile portion for arrangement at the multi-function profile member.
Figure 6:
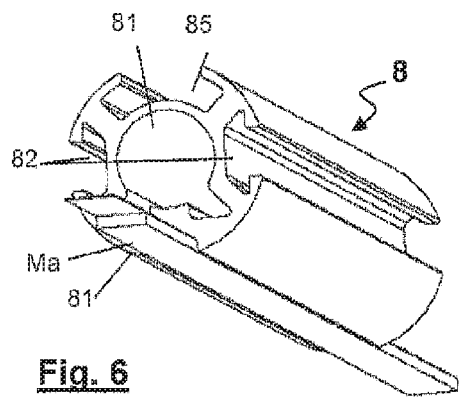
FIG. 6 shows a perspective view of the multi-function profile member with the additional arrangement of a measuring element.
Figure 8:
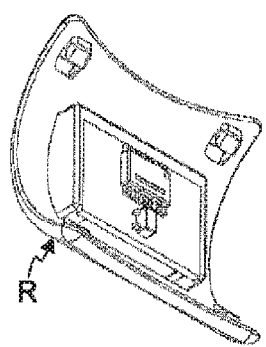
FIG. 8 shows a perspective view of a sensor arrangement for arrangement at the multi-function profile member.

FIGS. 5A and 5B clearly show the above-described arrangement and the configuration of the receiving grooves. FIG. 7 shows just the toothed rack element 43 with its foot 44 adapted to the undercut configuration of the second receiving groove 85 associated therewith. As shown in FIG. 6 arranged in the third receiving groove 86 for measuring a displacement travel of the toothed rack element 43 is a linear measuring element, here in the form of a magnetic strip Ma. A suitable sensor means R, a device for receiving and processing a travel measurement signal generated by the change in the magnetic field of the magnetic strip is shown in FIG. 8. It is of a half-shell shape and is fixed to the receiving portion 31 centrally with respect to the operative axis w.

FIGS. 9-12 show different configurations of the manipulator M, wherein in this case up to six joints 1 are functionally operatively connected together to constitute the manipulator M. These are possible options by way of example for combining the joints 1 together. The manipulator M can be in particular a joint arm robot. Ideally the manipulator M is in the form of a 6-axis manipulator M.

Figure 9:
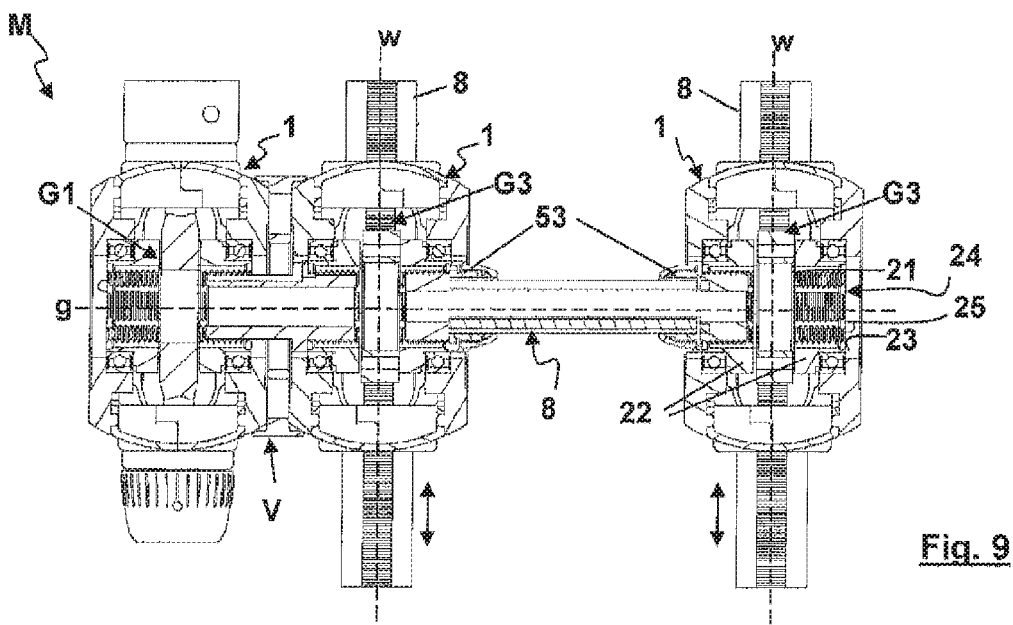
FIG. 9 shows a longitudinal sectional view of a further embodiment of the manipulator with three joints coupled together.

In FIGS. 6-12 up to five joints 1 are arranged coaxially with respect to a common transmission axis G and in parallel spaced relationship. They are held in parallel spaced relationship with each other by way of a connecting device 9. As shown in FIG. 9 a group with three joints 1 is arranged on a common transmission axis of rotation G, wherein the joint 1 at the left in FIG. 9 has a worm transmission G1 and the other two joints 1 each have a linear transmission G3. A torque is coupled into the gear wheel 2 of the joint 1 adjacent thereto by the joint 1 having the worm transmission G1. A multi-function profile member 8 is arranged between the other two joints 1 with the linear transmission G3 for transmission of a torque between the two joints 1. The multi-function profile member 8 is connected non-rotatably and non-displaceably to the gear wheels 2 of the two joints 1 at the ends by way of a respective connection mounting 53. Accordingly, in this case the multi-function profile member 8 serves as a torque-transmission shaft between the two joints 1 with the linear transmission G3.

FIGS. 10A to 10B each show a view of a further embodiment of the manipulator M with three joints 1 which are arranged in succession with respect to the operative axis w and which respectively have worm transmissions G1, the worm transmissions G1 of the joints 1 being of identical structure. The joints 1 are held spaced from each other by way of individual second portions 84 of a multi-function profile member 8. Similarly to the embodiment of FIG. 1 passed through those second portions 84 is a common drive shaft 51 which at the end ends in a first portion 84 of the multi-function profile member 8 and drives the worm transmissions G1 of all three joints 1.

Figure 11:
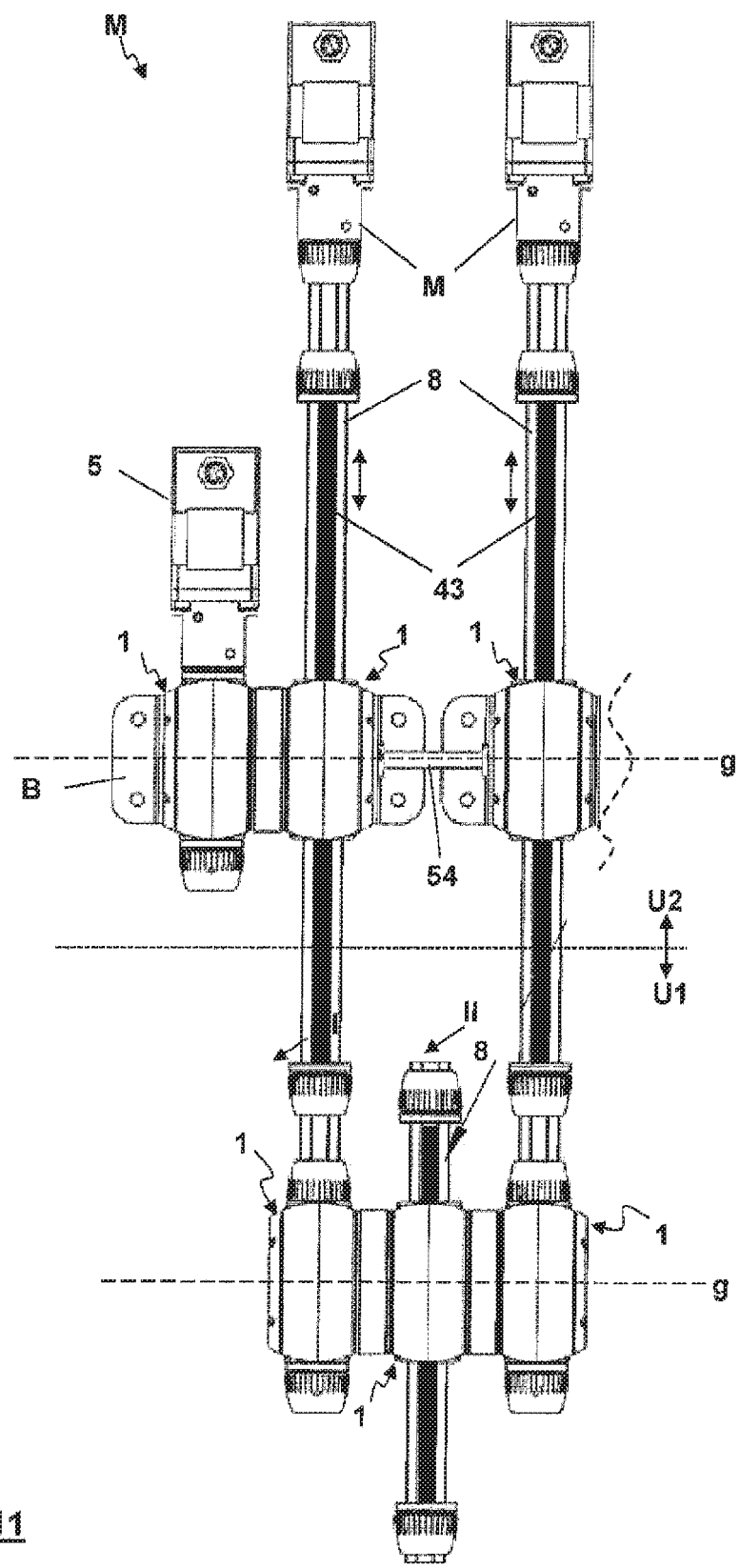
FIG. 11 shows a side view of a further embodiment of the manipulator with six joints coupled together.

In the embodiment of the manipulator M in FIG. 11 the joints 1 can be divided from the point of view of their functional relationship into a first group U1 and a second group U2, wherein the second group U2 arranged at the top in FIG. 11 has already been described with reference to FIG. 9. The second group U2 is fixed to a base B. The two outer joints 1 of the first group U1 are respectively connected by way of a multi-function profile member 1 with incorporated toothed rack element 43 to a motor 5 which is arranged at the top in FIG. 11 and the torque of which is transmitted to the respectively associated outer joint 1 by way of a drive shaft 51 (not visible here) which passes through the respective multi-function profile member 8. By virtue of the two joints 1 with linear transmission G3 the respectively associated multi-function profile member 8 with incorporated toothed rack element 43 is linearly displaced. As the gear wheels 2 of those two joints 1 are here non-rotatably connected together by way of a drive shaft portion 53 the two associated multi-function profile members 8 are displaced synchronously with each other. The joint 1 arranged centrally in the first group U1 is also equipped with a linear transmission G3 (not visible here), by which the multi-function profile member 8 passing through that joint 1 is linearly displaced.

Figure 12A:
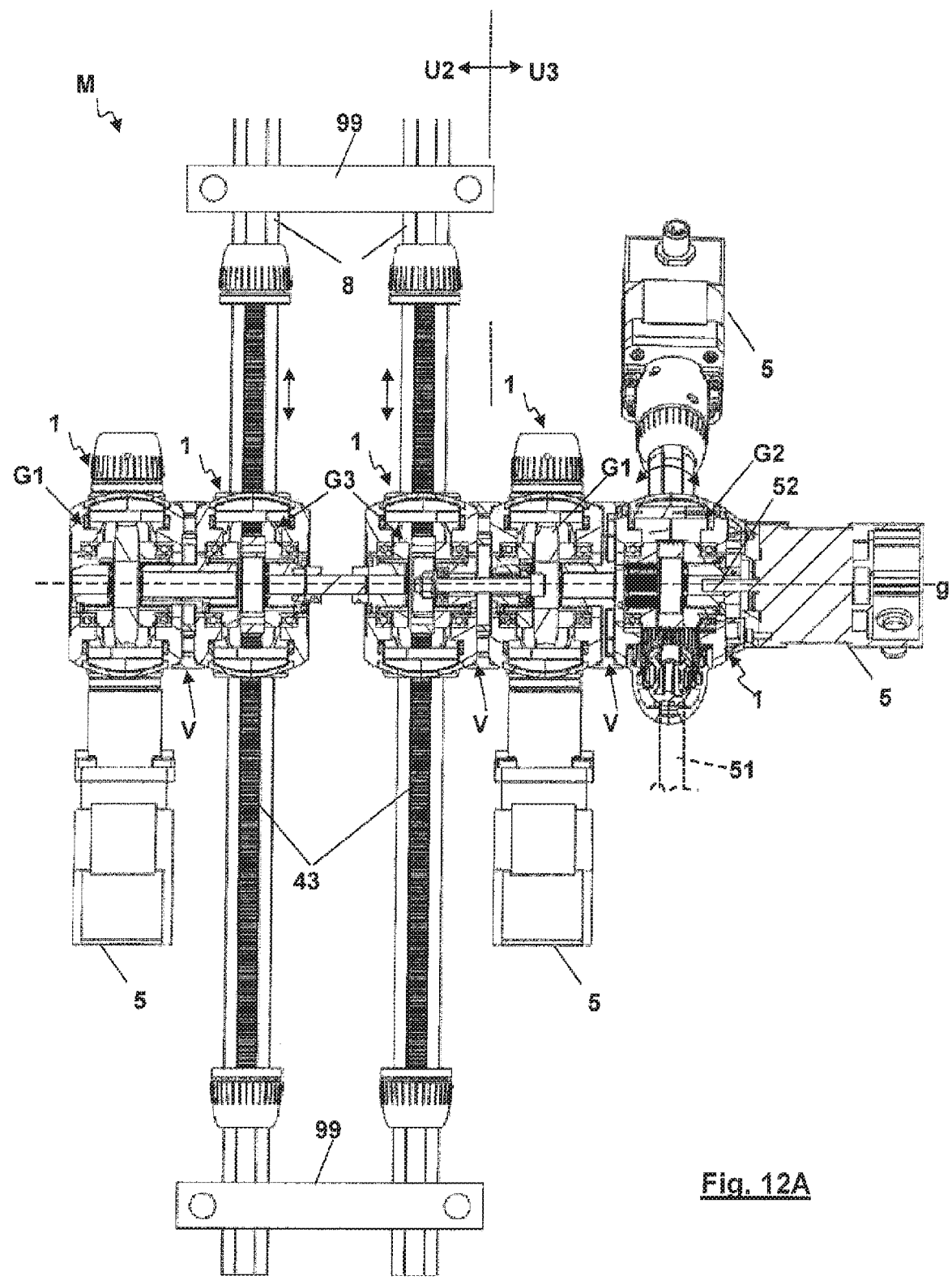
FIGS. 12A-12B each show a view of a further embodiment of the manipulator with respectively five and six joints coupled together.
Figure 12B:
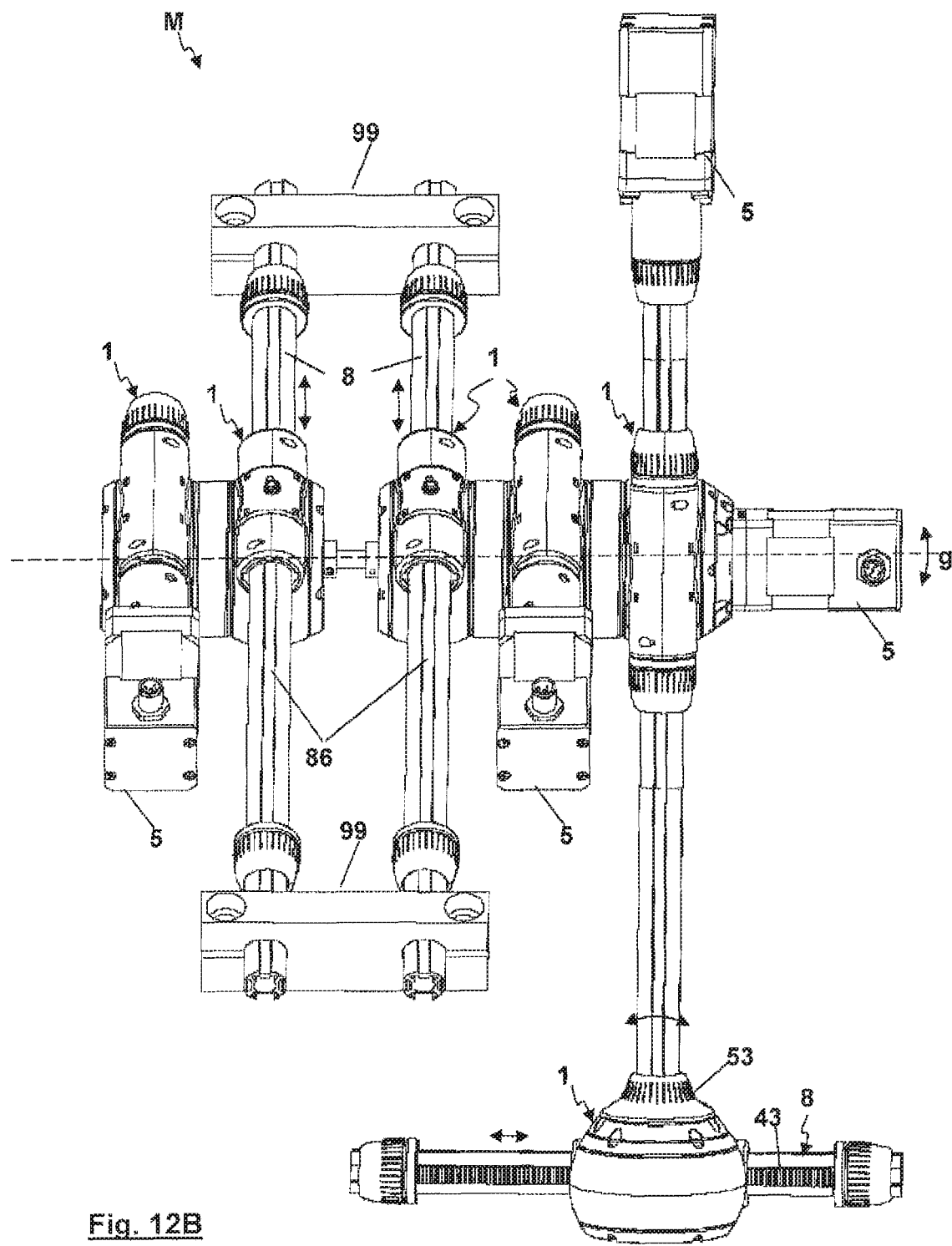

FIGS. 12A and 12B show a sectional view and a view from below with respect to the base B of a further embodiment of the manipulator M, here with five and six joints 1 respectively. In the underneath view shown in FIG. 12B the toothed rack elements 43 fitted into the multi-function profile members 8 are concealed as they face towards the gear wheel 2 of the respectively associated joint 1. The joints 1 can also be divided into two groups U2; U3. The joints 1 of both groups U2; U3 are arranged coaxially on a transmission axis of rotation g.

The group which here is at the left is the second group U2 which has already been mentioned. As the toothed rack elements 43 respectively mounted to a hollow profile member 8 are synchronously linearly displaced while being held parallel to each other, then, as shown in FIG. 12, they can be fixedly connected together by way of transverse bars 99 for stabilisation thereof.

In the joint 1 at the right in FIG. 12 of the group U3 at the right in FIG. 12 the multi-function profile member 8 connects the associated motor 5 which is here arranged above to a further individual joint 1. In this case, as indicated in FIG. 12A by broken lines, it is provided that the drive shaft 51 driven by the motor 5 passes in a multi-function profile member 8 through the joint 1 at the right in FIG. 12A. It passes through the connection mounting 53 provided at the joint 1 in order to be connected in torque-transmitting relationship to the gear wheel of the downwardly arranged individual joint 1. That individual joint 1 has a linear transmission (G3) which is concealed here and to which the connected multi-function profile member 8 with the toothed rack element 43 indirectly points.

The joint 1 at the right in FIG. 12A of the third group U3 has an inverted worm transmission G3. As described in relation to FIGS. 2 and 3 in the case of an inverted worm transmission G2 the further transmission element 4 is arranged at the drive output side, is driven by the gear wheel 2 which here is at the drive input side, and is here non-rotatably carried on the multi-function profile member 8, whereby same is also driven. The multi-function profile member 8 thus serves at the same time as a shaft. The multi-function profile member 8 receives the torque of the motor 5 which here is at the right, the torque being transmitted by way of the inverted worm transmission G2, and couples it by way of the connection mounting 53 into the housing 3 of the downwardly arranged individual joint 1 whereby the joint 1 is rotated about that multi-function profile member 8. The joint 1 at the left in FIG. 12 has a worm transmission G1 driven by the downwardly pointing motor 5. It couples the torque into the housing 3 of the right-hand joint 1 of the third group U3 so that in that way the right-hand joint 1 with the connected motor 5 is rotated about the transmission axis of rotation g.

LIST OF REFERENCES 1 joint
2 gear wheel
21 end
22 adaptor
23 side
24 opening
25 female thread
26 worm gear
27 male thread
28 spur gear
29 external tooth arrangement
3 housing
31 receiving portion
4 further transmission element
41 worm
42 spur tooth arrangement
43 toothed rack element
44 foot
45 anchor element
5 motor
51 drive shaft
52 motor shaft
53 connection mounting
54 drive shaft portion
65 clamping element
651 inner sleeve
652 outer sleeve
67 setting unit
671 adjusting device
7 bearing
71 clamping ring
72 projection
73 front bearing
74 rear bearing
8 hollow profile member
81 internal passage
82 first receiving groove
83 first portion
84 second portion
85 second receiving groove
86 third receiving groove 87 longitudinal chamber
9 connecting device
99 transverse bar
a spacing direction
g transmission axis of rotation
w operative axis
B base
G transmission
G1 worm transmission
G2 inverted worm transmission
G3 linear transmission
M manipulator
Ma magnetic strip
R sensor means
S inclined plane
U1 first group
U2 second group
U3 third group
V connecting device

What is claimed is:

1. A manipulator comprising:
at least one multi-function profile member as a supporting connecting element between two joints of the manipulator and/or between a joint of the manipulator and a motor assigned to the joint,
wherein the multi-function profile member has a circular cross-sectional profile, a first receiving groove, a second receiving groove and an internal passage,
wherein the first and second receiving grooves extend laterally in a longitudinal direction of the multi-function profile member and are configured opened outwardly transversely to the longitudinal direction of the multi-function profile member,
wherein at least one further multi-function profile member is provided, the further multi-function profile member having a circular cross-sectional profile,
wherein the circular cross-sectional profile of the multi-function profile member and the circular cross-sectional profile of the further multi-function profile member are of identical structure, and
wherein the two joints or the one joint, respectively, each have a gear wheel, which is rotatable about a transmission axis of rotation and arranged in a housing of the respective joint, and a further transmission element, which is arranged in a receiving portion of the housing, the gear wheel and the further transmission element form a transmission,
wherein the transmission is in a form of
a worm transmission including a worm gear as the gear wheel at the driven side and a worm as the further transmission element at the drive side of the transmission, wherein the worm is arranged non-rotatably on a driveshaft, which is arranged to be guided in the internal passage of the multi-function profile member, the multi-function profile member is attached non-rotatably and nondisplaceably to the housing by the first receiving groove, and the further multi-function profile member is configured to be a rotatable shaft to transmit torque, or
an inverted worm transmission including a worm gear as the gear wheel at the drive side and a worm as the further transmission element at the driven side of the worm transmission, wherein the worm is non-rotatably arranged on the further multi-function profile member and fixed to it by the first receiving grooves, the further multi-function profile is configured to be a shaft, and the further multi-function profile member is rotatable about its longitudinal axis, or
a linear transmission including a sprocket as the gear wheel and a toothed rack element as the further transmission element which is arranged invariably in position in the second receiving groove that, in the installation position, is open towards the sprocket.

2. The manipulator according to claim 1, wherein the at least one first receiving groove and/or the second receiving groove are respectively of an undercut configuration.

3. The manipulator according to claim 1, wherein there are provided two first receiving grooves which are arranged diametrically with each other with respect to a longitudinal axis of the multi-function profile member.

4. The manipulator according to claim 1, wherein the multi-function profile member has a third receiving groove for a measuring element.

5. The manipulator according to claim 4, wherein the first receiving groove, the second receiving groove, and the third receiving groove are arranged peripherally at least substantially equally spaced.

6. The manipulator according to claim 5, wherein a straight line connecting two first receiving grooves, and a straight line connecting the second receiving groove and the third receiving groove are arranged in mutually crossed relationship with respect to a longitudinal axis of the multi-function profile member, wherein, in each case with respect to the longitudinal axis, one of the two first receiving grooves is arranged diametrally relative to the other of the two first receiving grooves and the third receiving groove is arranged diametrically with respect to the second receiving groove.

7. The manipulator according to claim 1, wherein the internal passage has a substantially circular cross-section.

8. The manipulator according to claim 1, wherein the internal passage has at least one lateral longitudinal chamber.

9. The manipulator according to claim 1, wherein the multi-function profile member and the further multi-function profile member are respectively connected at the driven side or the drive side to a joint respectively associated therewith.

10. The manipulator according to claim 9, wherein, at least one joint at the driven side and/or the drive side in relation thereto, a respective one of the multi-function profile member and the further multi-function profile member is connected to the at least one joint.

11. The manipulator according to claim 1, wherein the multi-function profile member is arranged on the transmission axis of rotation and/or on an operative axis of the respectively associated joint, the operative axis is spaced relative to the transmission axis of rotation and supports the further transmission element in or at the housing.

12. The manipulator according to claim 1, wherein the multi-function profile member engages the gear wheel at an end face of the gear wheel.

* * * * *